(12) United States Patent
Lippincott et al.

(10) Patent No.: X8766
(45) Date of Patent: Apr. 14, 1835

(54) TANNING HIDES

(76) Inventors: John Lippincott; John Hillyer

John Lippincott & John Hillyer
in the County of Philadelphia, Pennsylvania

Letters Patent,

The schedule referred to in these Letters Patent and making
part of the same containing a description in the words of the
said John Lippincott & John Hillyer themselves of their impro-
vement in the process of Tanning Hides
To all to whom these presents shall come
Be it known that we John Lippincott & John Hillyer, both
of the County of Philadelphia and the State of Pennsylvania
Tanners and Curriers have invented or discovered a new and
useful improvement in Tanning Hides for chaise or Gig Tops,
Saddle and Harness leather &c, and that the following is a
full and exact description of the same as invented or discover
-ed by us, To Wit
The hides after they have passed through the process
necessary to prepare them for the application of bark or liquor
impregnated with tannin matter are sewed up so as to form
bags or sacks, and filled with bark, or bark liquor after bags
& sacks formed from the hides to be tanned, are thus filled
they are entirely closed up and thrown one upon another
into bark. liquor in a vat in such manner that their weight
(or other pressure which may be added if requisite) shall tend
to force the contents out through the pores of the hides by
which means the tanning matter is forced into the body of the
hides and incorporated therewith thereby facilitating the
change from untanned hide to leather, To keep up the
operation the bags or sacks formed as aforesaid, of the hides
that are undergoing the process of being tanned. are frequent
ly refilled or replenished to supply the place of the liquor which may have leaked or oozed out and their position is also changed that the different parts thereof may be equally acted upon. When the hides shall have been sufficiently impregnated with the tannin-matter (which will be in a short time) they will be ripped open and emptied of their contents, and finished in the usual manner, The principle objects intended to be attained by the hereinbefore described improvements are to force the tannin-matter, into the hides and thereby expedite the process of converting hides to leather by which the necessity of keeping them in the bark or tannin for a great length of time is obviated and the saving of bark as by the above described process there is little or no loss of material and also the saving of labour, The part believed to be new and claimed as an invention or improvement is the plan of tanning hides for the purposes before mentioned by forming them into bags or sacks to contain the tannin matter, and applying pressure to force the tannin into the body of the hides as herein before mentioned, As it is believed that a process somewhat similar to the above has been adopted by others in tanning the skins of goats and other small animals the inventors lay no claim to tanning skins on the foregoing plan - but confine their claim to such only as are usually termed hides John Lippincott
John Hillyer Witnesses
David B. Lee
M. V. Bryant

[illegible]